H. A. PIKE.
COFFEE POT.
APPLICATION FILED JAN. 11, 1908.
992,053.
Patented May 9, 1911.
2 SHEETS—SHEET 1.
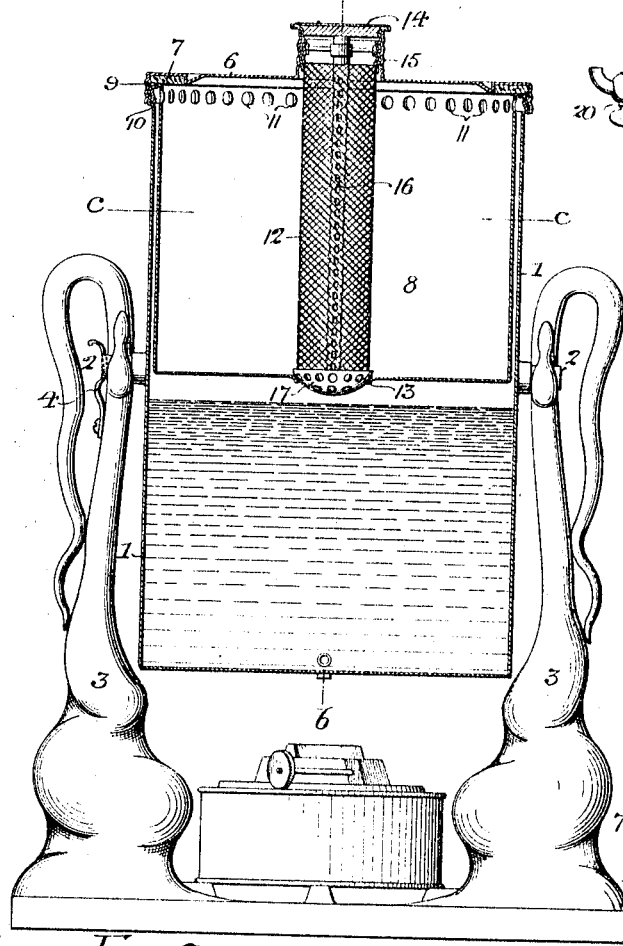
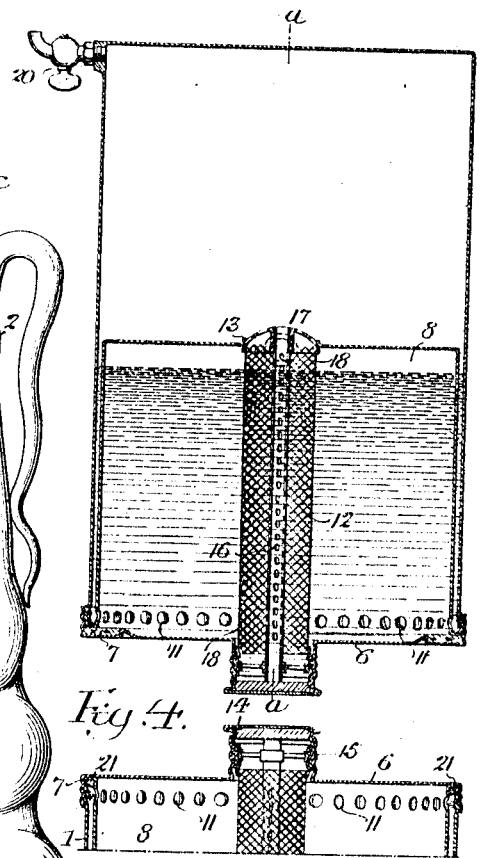
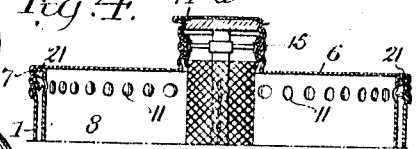
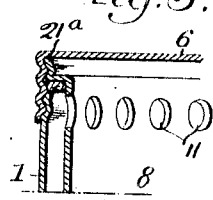
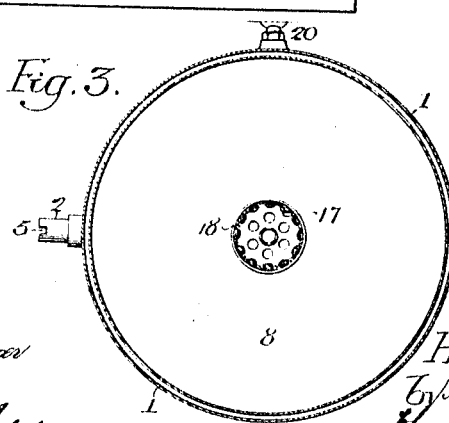
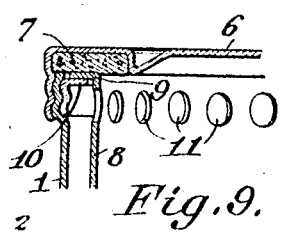
Witnesses:
Inventor,
Harvey A. Pike.
by his Attorneys,
Howson & Howson

H. A. PIKE.
COFFEE POT.
APPLICATION FILED JAN. 11, 1908.

992,053.

Patented May 9, 1911.

2 SHEETS—SHEET 2.

Witnesses:
Walter F. Pullinger
Augustus B. Coppes

Inventor
Harvey A. Pike.
by his Attorneys
Howson & Howson

UNITED STATES PATENT OFFICE.

HARVEY A. PIKE, OF NEW YORK, N. Y.

COFFEE-POT.

992,053.

Specification of Letters Patent.

Patented May 9, 1911.

Application filed January 11, 1908. Serial No. 410,329.

*To all whom it may concern:*

Be it known that I, HARVEY A. PIKE, a citizen of the United States, and a resident of New York city, New York, have invented certain Improvements in Coffee-Pots, of which the following is a specification.

My invention relates to coffee pots of the type described and claimed in my pending application, filed March 1, 1907, Serial No. 360,099; the object of my present invention being to provide certain improvements in the details of the structure, and also to provide an attachment capable of use with the structures known as "Thermos" bottles, whereby coffee may be made in the same.

Figure 6:
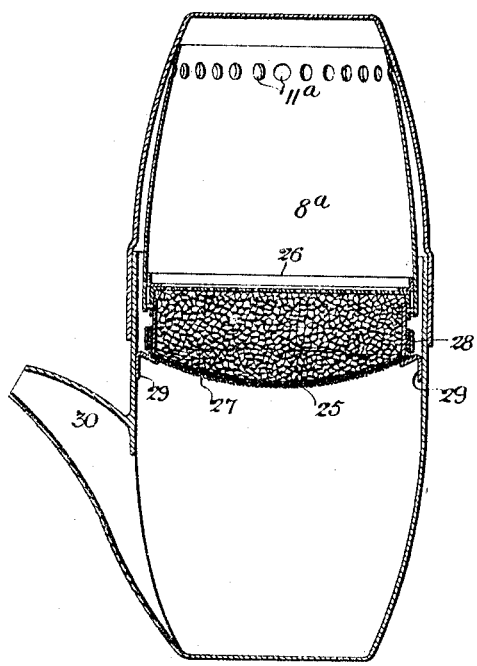
Figure 8:
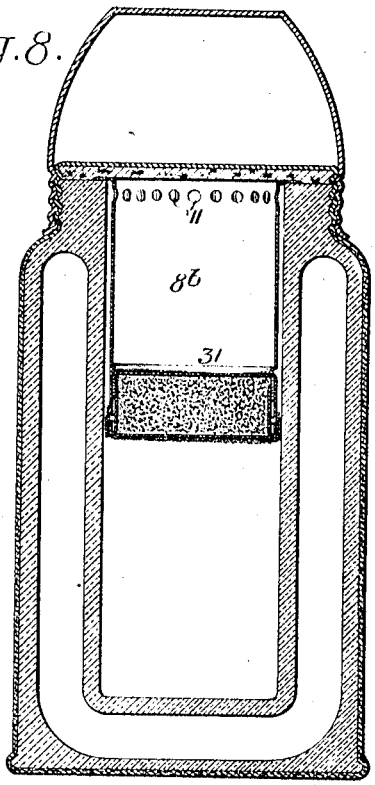
Figure 7:
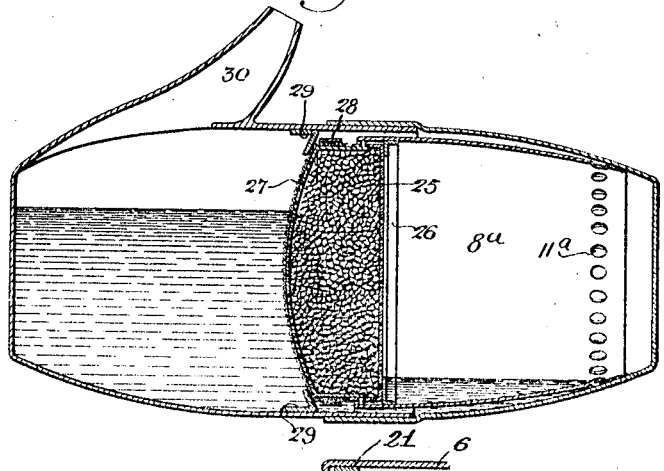
Figure 10:
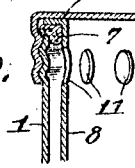

My invention is fully shown in the accompanying drawings, in which:

Figure 1, is a sectional view of a coffee pot embodying my present improvements, taken on the line a—a, Fig. 2; Fig. 2, is a similar sectional view showing the structure in inverted position, taken on the line b—b, Fig. 1; Fig. 3, is a sectional plan view on the line c—c, Fig. 1; Figs. 4 and 5, are views illustrating modifications of the structure shown in Figs. 1 and 2; Fig. 6, is a sectional view of another form of coffee pot embodying my invention; Fig. 7, is a similar sectional view at right angles to Fig. 4, showing the manner of transferring the liquid; Fig. 8, is a sectional view of a "Thermos" bottle with which my improved attachment has been combined; Fig. 9, is an enlarged sectional view of a portion of the structure shown in Figs. 1 and 2, and Fig. 10, is an enlarged sectional view of a portion of the structure shown in Fig. 4.

As in my application above referred to, the coffee pot forming the subject of my present improvements is designed to permit transfer of the liquid bodily within the same from one portion of the structure to the other without opening the same, whereby the liquid may be caused to flow a second time through the coffee, or, if desired, a weaker infusion may be made of the same.

In my present invention, I desire to obviate the necessity of shifting the coffee container from its normal position in order to transfer the liquid which has passed through the coffee container from one portion of the coffee pot to the other. To accomplish this, I provide a coffee container that is combined with or carried by a removable cup.

In the structure shown in Figs. 1 and 2, 1 represents a shell or casing forming the coffee pot, which is preferably provided with trunnions 2 whereby it may be mounted in a suitable stand 3; being held against movement by a spring arm 4 engaging a slot 5 is one of the trunnions. The casing 1 is closed by a screw cover 6 provided with a gasket 7 of suitable material, cork for instance, to insure a substantially liquid-tight joint.

Disposed within the upper part of the casing is a cup-like receptacle 8 having an outwardly projecting rim 9 which rests upon a shoulder 10 carried by the casing adjacent the mouth of the same. This cup is provided with a series of perforations 11 near its top, and centrally disposed with respect to said cup, but carried by the screw cover of the casing, is a tubular coffee container 12; the lower end being rounded and engaging a seat 13 in the bottom of the cup, while the upper end is threaded into a cap 14 which in turn is threaded into a projection 15 carried by the cover of the casing, such connection being so made as to be substantially water-tight.

In order to permit proper percolation of the water through the coffee within the container 12, the latter is provided with a central perforated pipe 16, which carries a perforated and rounded bottom member 17 fitting the seat 13 in the cup 8, to which member the gauze or other material 18 forming the wall of the container is secured.

In operation, the cap of the container is removed and the latter is filled with coffee in the usual manner; water is placed in the casing to substantially the height shown and then the cup 8 is placed therein and the cover screwed on. The coffee container can then be passed through projection 15 and the cap 14 screwed thereon, bringing the coffee container in contact with the seat 13 in the bottom of the cup 8. The structure is then mounted in the stand as shown, and the water in the lower part of the casing heated to the desired degree. When this is done, the structure is inverted in the manner shown in Fig. 2, and all of the water except that immediately surrounding the cup, will flow into the latter through the perforations 11, and will thereby come into contact with the coffee within the container. Upon reversing the coffee pot to the position shown in Fig. 1, the water, now within the cup 8, will percolate through the coffee and drip from the container and the central perforated tube of the same into the lower part of the casing, from which it may be drawn through a spigot 20.

In lieu of boiling the water within the casing, hot water may be originally poured into the same.

In the structure shown in Figs. 1 and 2, the cup 8 carrying the coffee container rests on a rim within the coffee pot; being loosely mounted therein. When the cover of such pot is screwed into place, the cup is maintained in a water-tight condition with the casing by means of the cork gasket or washer. In some instances, however, I desire that the coffee container shall be removed with the screw cover, and in Figs. 4 and 5, I have shown such arrangement. In the structure shown in Fig. 4, the cup 8 has a flanged top 21 which may be soldered to the under side of the screw cover; a gasket 7 of cork being set between the threaded flange of the cover and the wall of the cup to seal the joint with the wall of the coffee pot.

In the structure shown in Fig. 5, the cup has a threaded flange 21$^a$ whereby it may engage the screw cover over which the cap may be screwed, and in this arrangement a gasket is carried in the same manner as in Fig. 4, to make a sealed joint with the wall of the coffee pot.

The structure shown in Fig. 6, is somewhat similar to those shown in my pending application, except that I provide the upper section of the same with an inner shell 8$^a$, which forms a cup; such shell being perforated at 11$^a$ and secured by soldering or otherwise to the inner wall of the casing. In this form of the structure, I provide a coffee container 25 somewhat like those shown in my pending application and consisting of a pair of perforated cups fitting each other, such container fitting substantially the inner wall of the shell 8$^a$ and resting against a seat 26 provided thereon. Over the lower perforated cup or section of this container I preferably stretch a cloth 27 which is confined in place by a ring 28 to prevent dislodgment. The sections of the container are confined together by bayonet joints, and the lower section of the structure has lugs 29 engaging the under side of said container. Water may be placed in the lower part of this structure in the same manner as is indicated with regard to Fig. 1, such water to be heated after being placed in the receptacle, or poured in hot, and then to transfer such water to the cup, the receptacle is tilted in the manner shown in Fig. 7 so as to avoid spilling any liquid from the spout 30; the liquid running into the cup 8$^a$ through the perforations 11$^a$, until filled. The position of the structure is then reversed and the water in the cup will percolate through the coffee in the container and when a proper infusion is made it may be poured from the lower section of the structure through said spout.

In Fig. 8, I have shown my improved attachment employed in connection with a "Thermos" bottle. These bottles are well known and their object is to retain heat or cold, as the case may be. With this bottle I provide a cup 8$^b$, substantially the same as that shown in Fig. 1, which has a flange to rest on top of the bottle and be held in place by the screw cover 31 of the same. This cup is provided with a coffee container of substantially the same character as those shown in Figs. 4 and 5, held frictionally or otherwise in said cup against a bead 32 forming a seat. In the operation of this structure, hot water is poured into the bottle and left there until such time as it is desired to use the same, when the bottle is inverted in the usual manner and the water will flow into the cup 8$^b$ through the perforations 11 of the same. From such cup it can percolatae through the coffee in the container to the lower part of the bottle and may be poured from the same by removing the cup.

In all instances the liquid may be passed back into the cup a number of times if it be desired to add strength to the infusion. In the structure shown in Figs. 1 and 2, a weaker infusion may be made by lifting the tubular container from its seat and allowing the water to flow from the cup without passing through the coffee.

I claim:

1. A coffee pot comprising a liquid holding receptacle, a cup suspended within the upper part of said receptacle and spaced a slight distance from the wall of the same, retaining means for said cup, and a coffee container disposed within said cup, said cup dividing the interior of said liquid holding receptacle substantially into two chambers and having at its upper end provision for communication with said liquid holding receptacle whereby liquid placed within the lower portion of the latter may be transferred to the cup by inverting the receptacle.

2. A coffee pot comprising a liquid holding receptacle, a cover for the same, a cup suspended within the upper part of said receptacle and spaced a slight distance from the wall of the same, said cup being retained in place by the cover, and a coffee container disposed within said cup; said cup dividing the interior of said liquid holding receptacle substantially into two chambers and having at its upper end provision for communication with said liquid holding receptacle whereby liquid placed within the lower portion of the latter may be transferred to the cup by inverting the receptacle.

3. A coffee pot comprising a liquid holding receptacle, a cup mounted within the same and substantially filling the upper half of said receptacle with a space between said cup and the wall of the receptacle, retaining means for said cup, and a coffee container mounted within said cup, the wall of said cup being apertured near its upper edge adjacent the top of the liquid holding receptacle whereby liquid placed within the latter may be transferred to the cup by inverting said receptacle.

4. A coffee pot comprising a liquid holding receptacle, a cover for the same, a cup mounted therein and held in place by the cover and substantially filling the upper part of said receptacle with a space between said cup and the wall of the receptacle, and a coffee container mounted within said cup, the wall of said cup being apertured adjacent to the top of the receptacle whereby liquid placed within the latter may be transferred to the cup by inverting the receptacle.

5. A coffee pot, comprising a liquid holding receptacle, a cup disposed therein near the top of said receptacle, and a coffee container within the cup, said cup being mounted free of the wall of the receptacle and having perforations near its upper edge whereby liquid placed in the lower part of the receptacle may be transferred thereto by inverting the receptacle.

6. A coffee pot, comprising a liquid holding receptacle, a cover for the same, a cup disposed within said receptacle near the top of the same and held in place by said cover, and a coffee container within the cup, said cup being mounted free of the wall of the receptacle and having perforations near its upper edge whereby liquid placed in the lower part of the receptacle may be transferred thereto by inverting the receptacle.

7. A coffee pot comprising a liquid holding receptacle, a cup disposed within the upper portion of the same, a coffee container mounted within said cup, a cover for the receptacle, said cover also serving to keep the cup in place, and means for securing the coffee container to said cover.

8. A coffee pot comprising a liquid holding receptacle, a cover for the same, a cup disposed within the receptacle, a coffee container mounted within said cup and projecting through an opening in the cover of the coffee pot, and a cap for holding said coffee container against the bottom of the cup and serving to close the opening in the coffee pot cover.

9. A coffee pot, comprising a closed liquid holding receptacle, a cup secured therein dividing the interior of said receptacle into two chambers, and a coffee container disposed in one of said chambers, said cup being slightly less in diameter than the interior of the receptacle and having perforations adjacent its upper edge whereby upon inversion of the receptacle the liquid within the receptacle will enter said cup for percolation through the coffee.

10. A coffee pot, comprising a closed liquid holding receptacle, a cup secured therein dividing the interior of said receptacle into two chambers, a coffee container disposed within said cup, and means for retaining said container in place, said cup being slightly less in diameter than the interior of the receptacle and having perforations in its upper edge whereby upon inversion of the receptacle the liquid within the receptacle will enter said cup for percolation through the coffee.

11. In a coffee pot, the combination of a liquid holding receptacle, a cup mounted therein having a seat, a cover for said receptacle serving to hold said cup in place, an opening in said cover, a coffee container disposed in said opening and engaging the seat of the cup, and a cap for said cover serving to retain the coffee container in place.

12. The combination, of a liquid holding receptacle, a cup mounted at one end of the receptacle and substantially filling one-half of the interior of the same, a cover serving to close the end of the liquid receptacle and retain said cup in place, said cup having a seat in its wall opposite said cover and said cover having an opening, a tubular coffee container disposed in said opening and having its opposite end in engagement with the seat, said container having a perforated stem serving as a support, and a cap for said opening serving also to maintain the coffee container in contact with its seat.

In testimony whereof, I have signed my name to this specification, in the presence of two subscribing witnesses.

HARVEY A. PIKE.

Witnesses:
MURRAY C. BOYER,
JOS. H. KLEIN.